July 29, 1952   V. V. VACQUIER ET AL   2,605,341
DIRECTIONAL INDICATOR SYSTEM
Filed April 17, 1944
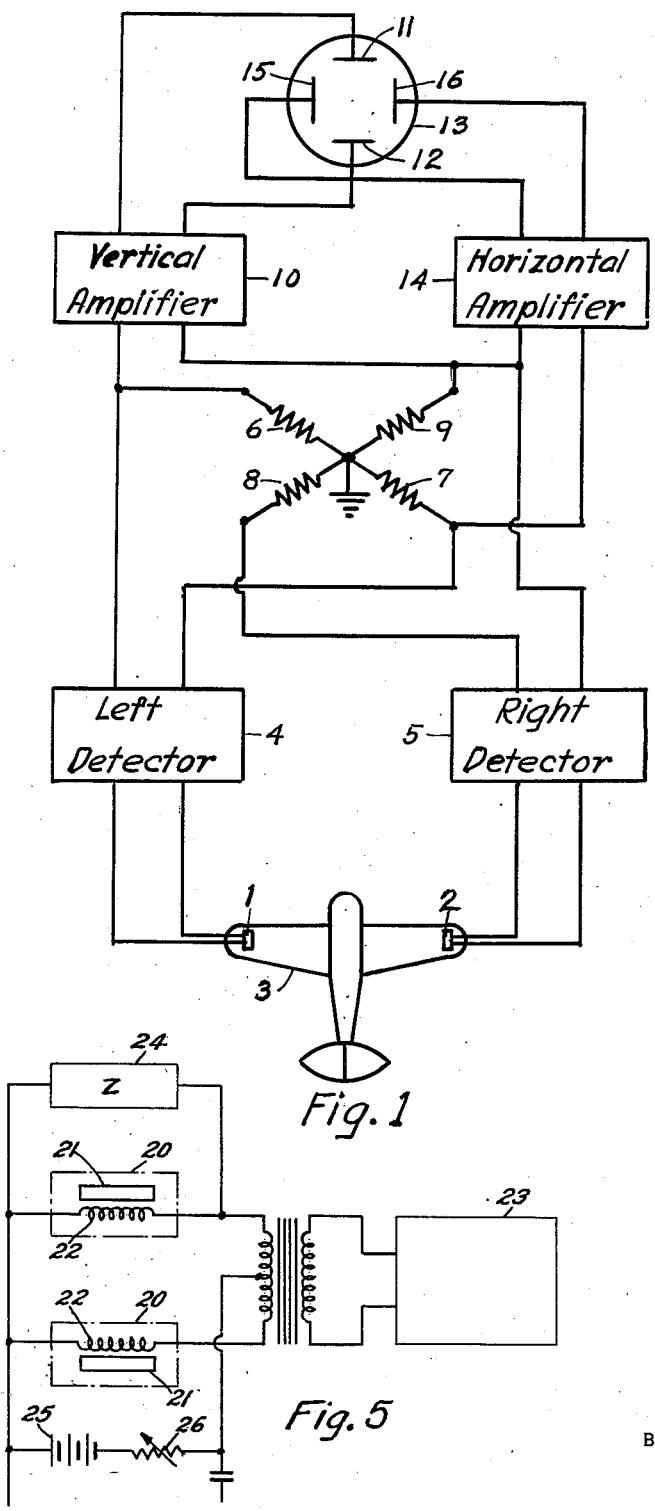
Fig. 1
Fig. 5
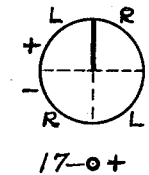
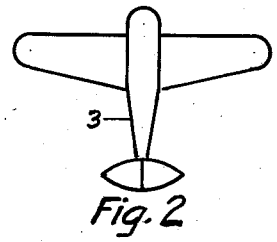
Fig. 2
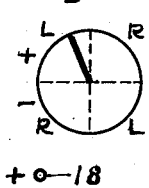
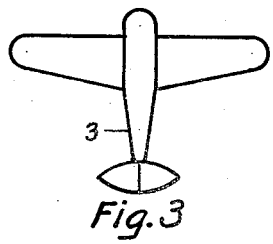
Fig. 3
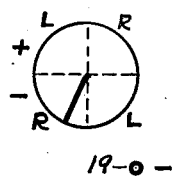
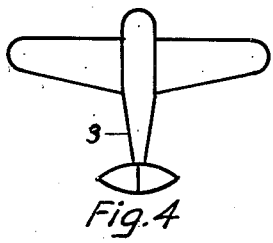
Fig. 4
INVENTOR
Victor V. Vacquier
BY John N. Adkins
W. Glenn Jones
ATTORNEY Patented July 29, 1952

2,605,341

UNITED STATES PATENT OFFICE 2,605,341

DIRECTIONAL INDICATOR SYSTEM

Victor V. Vacquier, Garden City, and John N. Adkins, Great Neck, N. Y., assignors to the United States of America as represented by the Secretary of the Navy Application April 17, 1944, Serial No. 531,422

5 Claims. (Cl. 177—352.6)

1

This invention relates to a directional indicator system adapted for indicating the lateral displacement of a carrier with respect to a magnetic peak, as well as the magnetic polarity of the peak. An arrangement in accordance with this invention is especially adapted for indicating the sense and approximate degree of lateral displacement of an airplane or other aircraft with respect to a magnetic peak located in the terrain or water over which the aircraft is traveling.

Various arrangements have been proposed in the past for indicating proximity to a magnetic peak of a carrier, as for example an airplane. Such arrangements were capable of providing an indication which varied as the aircraft approached or moved away from the magnetic peak, but such indications gave information only with respect to the strength of the peak, without revealing its lateral displacement with respect to the course of the aircraft. Since the indications obtained due to a given magnetic peak were an inverse function of the distance from the peak, it was possible, by making a number of exploratory trips in the vicinity of the peak, to determine the approximate location thereof with respect to the aircraft. Such a trial-and-error method was inefficient and time consuming, and incapable of effective results unless the peak remained at a relatively fixed point. When the peak moved around due to the presence of a submarine, determining the position of the peak with respect to the aircraft at any given instant was extremely difficult if not impossible.

It is an object of the present invention, therefore, to provide an improved directional indicator system which, when mounted upon an aircraft or other suitable carrier, is capable of providing a definite indication of the sense and approximate degree of lateral displacement of the course of the carrier with respect to a given magnetic peak, as well as of the magnetic polarity of the peak. It will be observed that an arrangement in accordance with the present invention is especially adapted for locating a submarine from an aircraft by determining the positions of the positive and negative magnetic peaks due to the presence of the submarine.

In accordance with the present invention, means are provided in a carrier which is movable relatively to a magnetic peak, for indicating the magnetic polarity of the peak together with the sense and approximate degree of lateral displacement of the course of the carrier with respect to the peak. Such means comprises first and second magnetometers disposed in laterally

2 spaced relation on the carrier, means for combining signals proportional to the outputs of these magnetometers to produce sum and difference signals, and substantially independent indicating means responsive respectively to these sum and difference signals.

For a better understanding of the invention, together with other and further objects thereof, reference is made to the following description, taken in connection with the accompanying drawings, and its scope will be pointed out in the appended claims. In the accompanying drawings:

Fig. 1 shows, partly in block form, a directional indicator system in accordance with the present invention; and Figs. 2-4 show, in block and schematic form, several different relative positions of the carrier with respect to the magnetic peak together with the type of indication corresponding with each such position which may be obtained with an arrangement in accordance with the present invention.

Fig. 5 is a schematic diagram of one of the magnetometers.

Referring now more particularly to Fig. 1, there is shown a pair of magnetometers 1 and 2 mounted respectively at the wing tips of airplane 3 and connected respectively to detectors 4 and 5. The balanced output of detector 4 is supplied to resistors 6 and 7 connected in series and having their junction grounded. Similarly, the output of detector 5 is connected to resistors 8 and 9 in series and having their junction grounded. The ungrounded terminals of resistors 6 and 9 are connected to the input of vertical amplifier 10, the output of which is connected to vertical deflecting plates 11 and 12 of cathode-ray tube 13. Likewise, the ungrounded terminals of resistors 7 and 9 are connected to the input of horizontal amplifier 14, the output of which is connected to horizontal deflecting plates 15 and 16 of cathode-ray tube 13.

In operation, direct-current voltage corresponding to the output of detector 4 appears across resistors 6 and 7 in series, this voltage being divided substantially equally between these two resistors. Likewise, the output voltage of detector 5 is substantially equally divided by resistors 8 and 9. It will be evident that the voltage appearing across resistor 6 will add to that appearing across resistor 9 in such a manner that the voltage supplied to vertical amplifier 10 will be equal to one-half of the sum of the detector output voltages. On the other hand, the voltage which is supplied to horizontal amplifier 14 will be the difference of the voltages appearing across resistors 7 and 9, and hence will be equal to one-half of the difference between the output voltages of detectors 4 and 5.

In one successful embodiment of the invention, magnetometers 1 and 2 were constructed in accordance with the copending application Serial No. 516,612 of Otto H. Schmitt for Unbalanced Magnetometers, filed January 1, 1944, now Patent No. 2,560,132, dated July 10, 1951, and detectors 4 and 5 were based upon the disclosure in his copending application Serial No. 531,624, filed April 18, 1944, for Detection Systems. Resistors 6, 7, 8 and 9 each had a value of 10,000 ohms. Amplifiers 10 and 14 were of conventional design and were adapted to amplify the fluctuating direct-current voltages supplied to them to an extent sufficient to secure usable deflections in cathode-ray tube 13. The fluorescent screen of cathode-ray tube 13 was of the long-persistence type. As described in Patent No. 2,560,132 and as seen in Fig. 5, the magnetometers are of the permeability type and measure either the absolute value of, or small changes in, a magnetic field. This field is set up by a magnetic peak. Each magnetometer employs a pair of substantially identical elements 20 including a core 21 and a coil 22 driven by an oscillator 23. An impedance 24 is mounted in shunt with one of the elements. The output of the magnetometer is a series of pulses of alternating polarity and varying magnitude. The information as to the strength of the magnetic field undergoing measurement is conveyed by the magnitude of the pulses and the direction of the magnetic field is determined by the polarity of the pulses at a given instant. Impedance 24 is furnished so that the cores are not driven to the same degree of saturation so as to provide a maximum difference in the heights of the positive and negative pulses in the presence of a magnetic anomaly. Battery 25 and variable resistance 26 serve to balance out the effect of the earth's ambient magnetic field.

The pulsed output from such magnetometers does not lend itself effectively to either indication or recording. Therefore the output of the magnetometers is supplied to the detectors which are responsive to the difference in magnitude of the alternate positive and negative pulses. The demodulated output is in the form of a fluctuating direct-current. This output is supplied through the resistance bridge to the amplifiers.

The operation of the invention of Fig. 1 may be more readily understood by reference also to Figs. 2–4. Referring particularly to Fig. 2, consider first the case in which airplane 3 is flying on a course which passes directly over a positive magnetic peak 17. In this case, the fluctuating direct-current voltage outputs of magnetometers 1 and 2 will be equal and both positive, so that their difference will be zero and deflecting plates 15 and 16 of cathode-ray tube 13 in Fig. 1 will not deflect the electron beam in a horizontal direction from its normal central position. The signal appearing between the ungrounded terminals of resistors 6 and 9, however, will be added, and when amplified and applied to deflecting plates 11 and 12 will produce a deflection of the electron beam vertically in a positive or upward direction. Since the fluorescent screen of cathode-ray tube 13 is of the long-persistence type, the resultant trace will be approximately as shown in Fig. 2.

Referring now to Fig. 3, there is shown the case in which a positive magnetic peak 18 lies to the left of the course followed by airplane 3. Under this condition the signals from magnetometers 1 and 2 are both positive and hence their sum, half of which appears between the ungrounded terminals of resistors 6 and 9, produces an upward deflection of the electron beam in cathode-ray tube 13. Magnetometer element 1 is nearer magnetic peak 18 than is magnetometer element 2, and therefore the voltage appearing between the ungrounded terminals of resistors 7 and 9 is negative, so that the electron beam in cathode-ray tube 13 is deflected to the left. The resultant trace is shown approximately in Fig. 3.

Fig. 4 illustrates the case in which a negative magnetic peak 19 lies to the right of the course of airplane 3. In this case, the signals from magnetometers 1 and 2 are both negative, with the result that the sum voltage appearing between the ungrounded terminals of resistors 6 and 9 is negative, so that the electron beam is deflected downward in cathode-ray tube 13. Magnetometer 2 being closer to magnetic peak 19 than is magnetometer 1, the difference voltage appearing between the ungrounded terminals of resistors 7 and 9 is negative, so that the electron beam in cathode-ray tube 13 is deflected to the left. The resultant trace, which lies in the third quadrant, is approximately shown in Fig. 4.

It will be apparent from the above description of the operation of the arrangement in accordance with the invention, that information is supplied to the observer not only regarding the magnetic polarity of the magnetic peak closest to the carrier, but also regarding the sense and approximate degree of lateral displacement of the course of the carrier with respect to the magnetic peak. The first item of information is conveyed by whether the electron beam is deflected upward or downward, an upward deflection indicating a positive magnetic peak and a downward deflection indicating a negative peak. Information as to the sense of lateral displacement of the course of the carrier with respect to the peak is conveyed by the horizontal deflection of the electron beam. A deflection in the first or third quadrant indicates that the magnetic peak lies to the right of the carrier's course, and a deflection in the second or fourth quadrant signifies to the observer that the peak under observation lies to the left of his course. The approximate degree of lateral displacement is indicated by the relative amounts of horizontal and vertical displacement of the electron beam. It will be apparent that, as the course of the carrier moves away from the magnetic peak, the magnitude of the difference of the outputs of magnetometers 1 and 2 will increase compared with the magnitude of the sum of these two outputs, which decreases under these conditions. By careful observation of the fluorescent screen, therefore, the observer is able to judge, within close limits, how far his course lies from the magnetic peak. His ability to make such judgements may be rapidly improved by practice flights at various known distances from a given magnetic peak.

In the description and drawings of the present invention, it has been assumed for simplicity of explanation that the aircraft or other carrier is movable on a course. The invention is equally applicable for use in aircraft capable of hovering, since its operation does not depend upon movement of the carrier. In such a case, the arrangement in accordance with the present invention will indicate the position of the magnetic peak with respect to a horizontal line which is perpendicular to the line joining the two magnetometers mounted on the carrier.

It will be understood that the indicating means employed may be other than the cathode-ray tube here shown and described by way of example. Indicating meters, colored light bulbs or their equivalent may be substituted for the cathode-ray tube without departing from the scope of the invention.

Where in this specification and the appended claims the term "magnetic peak" is used, reference is made to that point or points lying in a magnetic intensity contour-line pattern surrounding a magnetizable body at which change in magnetic field intensity is most marked. If the change is in a positive direction, the peak is said to be a positive peak. Similarly, a maximum in the negative direction produces a negative peak. More specifically, a magnetic dipole lying with its axis in a horizontal plane may produce a pair of magnetic peaks, one of which is positive and the other of which is negative. Such changes in the magnetic field strength are called magnetic anomalies, and they may be detected by passing over or near the peaks an instrument which is responsive to small changes in magnetic field strength.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

Having thus fully described our invention, we claim:

1. An apparatus spaced relatively from a magnetic peak comprising, a plurality of magnetometer means for measuring the absolute intensity of a magnetic field emanating from said peak mounted on said apparatus in spaced relation, said magnetometer means deriving signals in proportion to their distance from said magnetic peak, means combining the output of said magnetometer means to produce sum and difference signals, and indicating means responsive to said sum and difference signals for indicating the polarity of the peak and the degree of lateral displacement of the axis of the apparatus with respect to said peak.

2. In a carrier spaced relatively from a magnetic peak, an apparatus comprising a pair of laterally spaced magnetometer means of similar directional orientation for measuring the absolute intensity of a magnetic field emanating from said peak, each of said magnetometer means deriving signals in proportion to its distance from said magnetic peak, network means combining the signal output of said magnetometer means to produce sum and difference signals, and indicating means responsive to said sum and difference signals indicating the polarity of the magnetic peak and the degree of lateral displacement of the axis of the apparatus with respect to said peak.

3. In combination, a plurality of magnetometer means mounted on a carrier in substantially parallel relation, each of said magnetometer means including a core and at least one coil for measuring the absolute intensity of a magnetic field emanating from a magnetic peak, each of said magnetometer means supplying signals proportional to its distance from said magnetic peak, a detector means operatively connected to each magnetometer, a grounded resistance bridge connected to receive the outputs or said detector means for supplying sum and difference signals, and indicating means responsive to said sum and difference signals indicating the presence and direction of said magnetic peak.

4. Apparatus spaced relatively from a magnetic peak comprising; a pair of laterally spaced magnetometer means for measuring the absolute intensity of a magnetic field emanating from said peak; each of said magnetometer means being similarly oriented and deriving signals substantially proportional to its distance from said peak; bridge means for combining signals proportional to the outputs of said magnetometer means to produce sum and difference signals; said bridge means including a ground terminal, a circuit having two branches leading from said ground terminal to each of said magnetometer means, and resistance means in each of said branches; and indicating means responsive to said sums and difference signals.

5. An apparatus spaced relatively from a magnetic peak comprising, a plurality of magnetometer means for measuring the absolute intensity of a magnetic field emanating from said peak mounted on said apparatus in spaced relation, said magnetometer means deriving signals in proportion to their distance from said magnetic peak, means combining the output of said magnetometer means to produce sum and difference signals, and indicator means responsive to said sum and difference signals for indicating the polarity of the peak and the degree of lateral displacement of the axis of the apparatus with respect to said peak, said indicator means including a cathode ray tube having pairs of horizontal and vertical deflection plates, said sum signals being supplied to one pair of said plates and said difference signals being supplied to the other of said pair of plates.

VICTOR V. VACQUIER.
JOHN N. ADKINS.

REFERENCES CITED

The following references are of record in the file of this patent:

UNITED STATES PATENTS

| Number | Name | Date |
| --- | --- | --- |
| 1,839,290 | Bailey | Jan. 5, 1932 |
| 1,968,068 | Blancard et al. | July 31, 1934 |
| 2,340,282 | Dingley | Jan. 25, 1944 |

FOREIGN PATENTS

| Number | Country | Date |
| --- | --- | --- |
| 399,957 | Great Britain | Oct. 19, 1933 |